(12) United States Patent
Brown et al.

(10) Patent No.: US 6,586,510 B1
(45) Date of Patent: Jul. 1, 2003

(54) REMOVABLE EMULSION PRESSURE-SENSITIVE ADHESIVES

(75) Inventors: Ian Brown, Leiderdorp (NL); Graham Yeadon, Marbach (CH)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/464,055

(22) Filed: Dec. 15, 1999

Related U.S. Application Data (60) Provisional application No. 60/112,525, filed on Dec. 15, 1998.

(51) Int. Cl.[7] .............................. C08K 5/10; B32B 7/12
(52) U.S. Cl. .................. 524/311; 524/276; 526/317.1; 526/318.3; 526/318.4; 526/318.44; 526/318.5; 526/328; 526/329.7; 428/355 RA; 428/355 BL; 428/355 AC; 428/515; 428/511; 428/354
(58) Field of Search ................ 428/355 BL, 355 AC, 428/354, 355 RA, 515, 511; 524/276, 311; 526/561, 318.3, 318.4, 318.44, 318.5, 319, 317.1, 328, 329.7

(56) References Cited

U.S. PATENT DOCUMENTS

| 4,414,354 A | * 11/1983 | Slocombe | 524/460 |
| 4,925,908 A | 5/1990 | Bernard et al. | 526/320 |
| 5,558,913 A | * 9/1996 | Sasaki et al. | 428/41.5 |

FOREIGN PATENT DOCUMENTS

| WO | WO 93/10177 | 5/1993 |

* cited by examiner

Primary Examiner—James J. Seidleck
Assistant Examiner—Melanie Bissett
(74) Attorney, Agent, or Firm—Christie, Parker & Hale, LLP (57) ABSTRACT

Improved, removable PSA compositions and constructions contain an emulsion acrylic PSA copolymer of a plurality of acrylic monomers and at least one multifunctional crosslinking monomer, compounded with a wax and a plasticizer. Peel forces required to remove the constructions from a variety of substrates are notably smaller than those required to remove comparable compositions containing no crosslinking monomer.

34 Claims, 1 Drawing Sheet

REMOVABLE EMULSION PRESSURE-SENSITIVE ADHESIVES

CROSS-REFERENCE TO RELATED APPLICATION

This application claims the benefit of provisional application No. 60/112,525, filed Dec. 15, 1998.

FIELD OF THE INVENTION

The present invention is directed to label and tape constructions that exhibit clean removability from various substrates.

BACKGROUND OF THE INVENTION

Pressure-sensitive adhesive labels and tapes are well known. In a typical label construction, one or more layers of adhesive are coated on or otherwise applied to a release liner and then laminated to a backing, such as paper, polymeric film, or other ink-receptive, flexible material. In a typical tape construction, one surface of a polymeric film or woven paper is coated with an adhesive, and the construction is then wound up upon itself. A release liner is not generally required. Labels are usually die-cut and matrix-stripped before use. In contrast, tapes usually do not require die-cutting and matrix-stripping, and generally need not be ink-receptive.

Pressure-sensitive adhesives (PSAs) must be formulated to fit specific performance requirements, including sufficient shear, peel adhesion, and tack or quickstick, at various temperatures and on a variety of substrates. PSAs can exhibit a range of properties and are used in a broad spectrum of applications. Depending on the choice of facestock to which they are laminated, and the substrate(s) to which they are applied, PSAs may be classified as more or less "permanent," "removable," or "repositionable." When a permanent PSA tape or label is adhered to a substrate, the adhesive bond to the substrate grows over time, and the backing material cannot be removed without damaging the backing and/or the substrate, or without leaving an adhesive residue on the substrate. In contrast, removable PSAs can be removed from a substrate by application of a relatively small peel force, even after an extended period of time, because adhesion to the substrate remains constant, or grows only slightly over time.

At least two approaches to achieving good removability have been tried: control of the adhesive coating process and control of adhesive rheology.

It is known that adhesive peel forces can be reduced by minimizing the coat weight of the adhesive in the label or tape construction. Even at low coat weights, however, adhesion generally will grow with age, particularly on plastic and weak paper facestocks, and the adhesive will become non-removable due to the inherent permanent characteristic of most adhesives. One alternative to reducing the coat weight of the applied adhesive composition in a PSA construction is to use a discontinuous coat of adhesive segments over portions of the label or tape construction. This is described in European Patent 0180598. Another alternative is to include silica microspheres in the adhesive composition. This reduces the adhesive content of the applied adhesive composition. Examples of this approach are found in U.S. Pat. No. 3,691,140 (Silver), U.S. Pat. No. 4,166,152 (Baker et al), U.S. Pat. Nos. 4,495,318 and 4,598,212 (both to Howard), and U.S. Pat. No. 4,810,763 (Mallya et al.)

A rheological approach to rendering an adhesive removable is to design a high gel, low glass transition temperature ($T_g$) adhesive having a low tangent delta (tan $\delta$) at the de-bonding frequency. Adhesives having such properties behave like soft materials and exhibit a low adhesion force during the peel test. However, such adhesives can exhibit poor converting performance, including poor guillotining, due to adhesion between the adhesives and cutting blades and knives.

In order to be employed in modern label manufacturing apparatus, adhesives used in PSA labels must have good converting properties. During label manufacture, the label construction (i.e., a laminate of a face stock, PSA layer(s) and a release liner) is passed through apparatus that converts the construction into label stock and finished products, i.e., sheets or rolls of labels. The processes involved in the converting operation include slitting, die-cutting, and matrix-stripping to leave labels on a release liner; butt-cutting of labels to the release liner; marginal hole punching, perforating, fanfolding, guillotining, and the like. Die-cutting involves cutting of the laminate to the surface of the release liner. Hole punching, perforating and guillotining include cutting clean through the label/release liner laminate.

Unfortunately, removable and repositionable adhesives often exhibit poor converting properties. The viscoelastic nature of such adhesives can hamper precise and clean penetration of the die-cutting blades and slitting knives, and disrupt guillotining, die-cutting, and other converting operations. This can have commercially unacceptable consequences, as the cost of converting an adhesive laminate into a finished product is a function of the speed and efficiency at which the various processing operations occur. The choice of face stock in the label construction can also impact the ease and cost of convertibility, as well as label removability and repositionability.

Efforts to formulate removable and repositionable adhesives that convert well have met with mixed results. U.S. Pat. No. 4,548,845 (Parsons et al.) describes the use of polyalkylene glycols, such as polyethylene glycol (PEG), with tackified water insoluble elastomers to reduce the bonding between an adhesive and knife during the guillotining process. Unfortunately, phase separation and incompatibility between the adhesive system and PEG appear to have limited its amount and usage. U.S. Pat. No. 4,151,319 (Sackoff) and U.S. Pat. No. 4,346,189 (Laurent) describe the use of silicones to reduce the bonding between adhesives and cutting knives. The products display good guillotinability and initial repositionability. Unfortunately, repositionability is lost with time. International Patent Application Publication No. WO 93/10177, incorporated by reference herein, describes removable, repositionable and guillotinable PSA constructions made with a backing coated with an acrylic emulsion PSA modified by a wax, surfactant, or mixtures thereof. In some embodiments, a plasticizer is included. Although the invention described in the international application represents a positive advance in the art, a need exists for improved, removable, emulsion acrylic PSAs and PSA constructions, particularly for use with plastic and weak paper facestocks, where the constructions may be (repeatedly) removed and repositioned.

SUMMARY OF THE INVENTION

The present invention provides improved, removable, PSA compositions and constructions, including constructions made with plastic or weak paper facestocks, which heretofore have been more difficult to use in removable and repositionable label applications. In one embodiment, a PSA composition contains an inherently tacky, emulsion acrylic PSA copolymer compounded with an emulsifiable wax and a plasticizer. Removability of the composition is significantly improved by including in the copolymer a small amount—up to about 1% by weight—of a multifunctional crosslinking monomer. Removal of label or tape constructions prepared in accordance with the invention requires a substantially smaller 90° peel force, from a variety of substrates, than that required to remove a construction made with a comparable PSA composition differing only in its absence of a multifunctional crosslinking monomer. The peel force builds with time to far less extent than that seen with comparable constructions that lack the multifunctional monomer.

DETAILED DESCRIPTION

Figure 1:
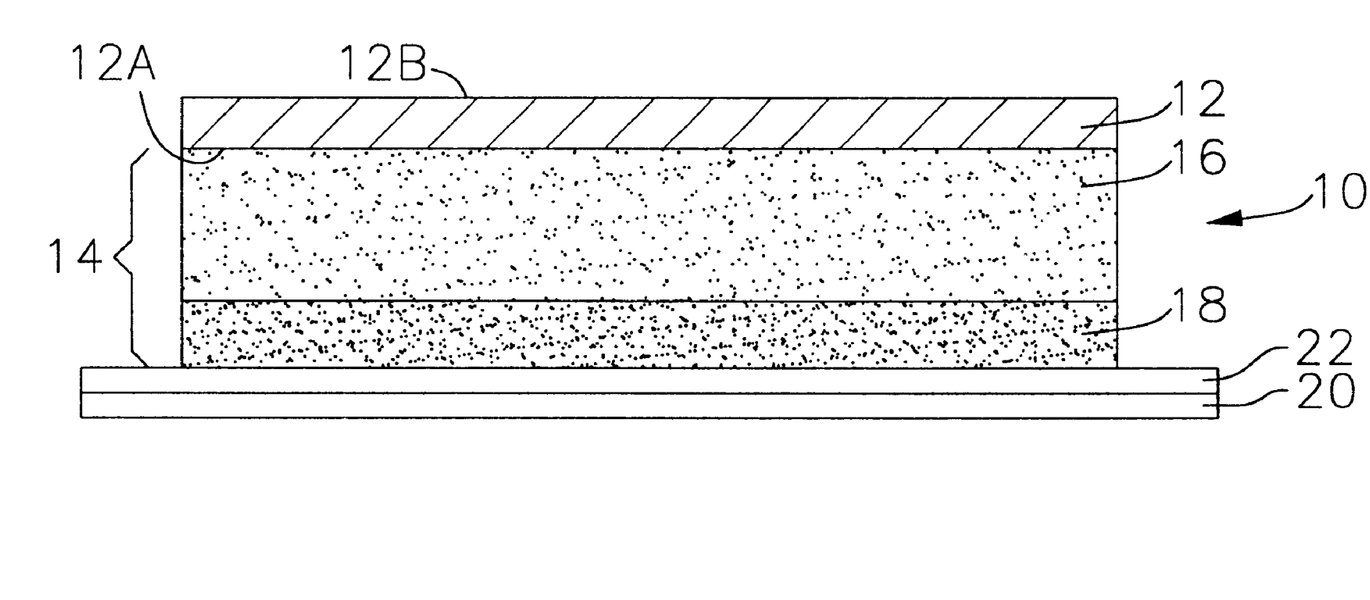
The FIGURE is a schematic, cross-sectional illustration of one embodiment of a multilayer adhesive construction according to the invention, showing a facestock, adhesive laminate with two adhesive layers, and a release liner.

In one embodiment of the invention a removable, PSA composition comprises a PSA copolymer of a plurality of copolymerizable monomers and at least one multifunctional crosslinking monomer, compounded with a wax and a plasticizer.

As used herein, the term "multifunctional crosslinking monomer" refers to a monomer having at least two carbon-carbon double bonds and which is copolymerizable with acrylic monomers and capable of undergoing (or facilitating) crosslinking reactions. Multifunctional crosslinking monomers include, for example, multifunctional acrylates and methacrylates, i.e., diacrylates, triacrylates, dimethacrylates, and trimethacrylates; and multifunctional allylic compounds, such as diallyl maleate and allyl methacrylate. Multifunctional monomers having a vinyl functionality are also included. A non-limiting list of multifunctional crosslinking monomers, along with their abbreviations, is presented in Table 1.

TABLE 1

Multifunctional Crosslinking Monomers

| Multifunctional Monomer | Abbreviation |
|---|---|
| Allyl methacrylate | AMA |
| Diallyl maleate | DAM |
| Divinyl benzene | DVB |
| Ethylene glycol dimethacrylate | EGDMA |
| N,N'-methylene-bis-acrylamide | NNMBA |
| Tripropylene glycol diacrylate | TPGDA |
| Triallyl cyanurate | TAC |
| Triethylene glycol dimethacrylate | TEDMA, TEGMA |
| Trimethylolpropane triacrylate | TMPTA |
| Trimethylolpropane trimethacrylate | TMPTMA, TRIM |
| Trimethylolpropane diallyl ether | TMPDAE |

PSA copolymers according to the present invention are formed from a plurality of copolymerizable monomers, the major portion of which is one or more alkyl acrylates having about 4 to 12 carbon atoms in the alkyl group. Total ($C_4$–$C_8$) alkyl acrylate content is at least about 84% by weight. Also present are at least 0.25% up to about 5% by weight of one or more acid monomers, with a mixture of acid monomers being preferred. There may also be present one or more "hard" monomers, present in an amount up to about 10% by weight. Polar monomers, in addition to the acid monomers, may also be included, in an amount up to about 8% by weight. 0.01 to 1% by weight of one or more multifunctional crosslinking monomers is included as an essential element.

Non-limiting examples of alkyl acrylates having about 4 to 12 carbon atoms in the alkyl group include butyl, hexyl, heptyl, n-octyl, iso-octyl, 2-ethylhexyl, and nonyl acrylate, with 2-ethylhexyl or a mixture of 2-ethylhexyl acrylate and butyl acrylate being preferred.

As used herein, the term "acid monomer" refers to an ethylenically unsaturated carboxylic acid. Non-limiting examples include acrylic acid, methacrylic acid, and itaconic acid. A mixture of acrylic and methacrylic acid is preferred. Acrylic acid oligomers, e.g., beta-carboxyethyl acrylate (β-CEA), also are useful acid monomers. β-CEA is available from Radcure® Specialties, Inc. (Louisville, Ky.) and Bimax Chemicals Ltd. (Cockeysville, Md.), as a mixture of the acrylic acid dimer (40–50%), trimer (20%), tetramer, and monomer (acrylic acid).

As used herein, the term "hard monomer" refers to a monomer the homopolymer of which is not inherently tacky at ambient temperatures and which has a $T_g$ greater than about −25° C. Non-limiting examples include methyl and ethyl acrylate, methyl and ethyl methacrylate, vinyl acetate, styrene, and acrylonitrile.

Polar monomers include, without limitation, such monomers as hydroxyethyl acrylate and methacrylate, hydroxypropyl acrylate, and glycidyl methacrylate.

Preferred PSA copolymers according to the present invention are formed from about 85 to 98% by weight of one or more alkyl acrylates having 4 to 12 carbon atoms in the alkyl group, with 2-ethylhexyl acrylate or a mixture of 2-ethylhexyl and butyl acrylate being preferred; and about 2% by weight of one or more ethylenically unsaturated carboxylic acids, with a mixture of methacrylic and acrylic acid being preferred. Monomer weight percentages are based on the total weight of those monomers. Also present is a small amount—from about 0.01 to 1% by weight—of at least one multifunctional crosslinking monomer, with diallyl maleate being preferred.

More preferably, the PSA copolymer contains about 98% 2-ethylhexyl acrylate, about 1.4% methacrylic acid, and about 0.6% acrylic acid, based on the weight of those monomers, combined with from about 0.025–0.5% by weight of diallyl maleate, based on the weight of all monomers, including the crosslinking monomer. Weights are given on a polymerized basis, meaning the copolymer contains, or is made from, the recited amount of each monomer.

It will be appreciated that the actual monomer mixture or plurality of monomers used to make the inherently tacky, emulsion acrylic PSA copolymer can have a formula that differs from the preferred embodiments. What is essential is that the combination of monomers total 100% and the resulting copolymer be inherently tacky and substrate-removable. In general, this will require that the combination of monomers yields a copolymer having a low $T_g$, i.e., less than about −45° C. (measured as the mid-point of a differential scanning calorimetry (DSC) curve), more preferably less than about −50° C. The preferred base polymer (made from 98% 2-ethylhexyl acrylate, 1.4% methacrylic acid, and 0.6% acrylic acid) has a $T_g$ of about −58° C. The glass transition temperature changes minimally when a small amount of multifunctional crosslinking monomer is added to the monomer mixture. For example, PSA polymer 3

(described below), containing 0.1% by weight of diallyl maleate, had a $T_g$ of −59° C., which is within experimental error of the measured $T_g$ value for the base polymer.

At present, it is not completely understood how the multifunctional crosslinking monomer operates. Its presence in the copolymer substantially lowered the room temperature 90° peel force required to move a tape or label construction made with the PSA composition. 90° peel forces are substantially smaller than that required to remove a comparable construction that differs only in its absence of the crosslinking monomer.

The inherently tacky, emulsion acrylic PSA copolymer is prepared using conventional free-radical polymerization techniques, as described, for example, in U.S. Pat. No. 5,623,011 (Bernard), which is incorporated by reference herein. Those skilled in the art will appreciate that a wide variety of initiators, surfactants, chain transfer agents, and other reagents can be used in the polymerization reaction.

In addition to the inherently tacky, emulsion acrylic PSA copolymer, the adhesive composition contains an emulsifiable wax and a plasticizer. Other additives and fillers, well known in the art, such as antioxidants, defoamers, surfactants, pigments, adhesive flow control agents(e.g., silica microspheres), odor masks (e.g., vanilla), and thickeners (to increase the viscosity of the PSA and improve its coatability), can be included in the formulation. The additives are mixed with the copolymer before the adhesive composition is coated on or applied to a release liner or backing.

Waxes are generally incompatible with acrylic PSA copolymers and so do not affect polymer $T_g$. They tend to migrate to the adhesive-substrate interface, and so control adhesion. Non-limiting examples of emulsifiable waxes include emulsified petroleum resins, paraffin waxes, oxidized paraffin waxes, microcrystalline waxes, carnauba waxes, montan waxes, polyethylene waxes, and the like, preferably emulsified to form a non-ionic wax emulsion. A preferred wax emulsion is Aquacer 533, available from BYK-Cera BV (Deventeer, The Netherlands).

Plasticizers tend to be compatible with acrylic PSA copolymers and depress polymer $T_g$. Non-limiting examples of plasticizers useful in the present invention include phthalates (e.g., butyl benzyl phthalate, and dioctyl phthalate), adipates, benzoates, citrates (e.g., triethyl citrate and acyl tributyl citrate), maleates, oleates, phosphates, sebacates, stearates, epoxidized vegetable oils, rosin derivatives, and polymeric plasticizers (e.g., low molecular weight acrylic polymers that lower the $T_g$ and storage modulus of the PSA). At present, the preferred plasticizers are butyl benzyl phthalate, triethyl citrate, and acyl tributyl citrate. The latter two plasticizers are available from Jungbunzlauer Ladenburg GmbH (Ladenburg, Germany. Triethyl citrate has the advantage of being consumer-friendly (it is an approved food additive).

In some embodiments, the PSA composition also contains a surfactant, which acts as a wetting agent and improves the coatability of the composition. A preferred surfactant is Aerosol OT-75, a dioctyl ester of sodium sulfosuccinic acid, available from Cytec Industries, Inc. (Morristown, N.J.).

When added to the PSA, some surfactants behave like a plasticizer or a wax, depending upon the chemical structure of the surfactant. If they are compatible with the acrylic copolymer and decrease the $T_g$, then they are plasticizers. If they are incompatible, then they are waxes.

Improved PSA compositions according to the present invention are conveniently made by compounding the inherently tacky emulsion acrylic PSA copolymer with an emulsifiable wax and a plasticizer. The relative amount of the components depends, in part, on the choice of facestock to which the adhesive composition is to be applied, the substrates to which the construction must adhere, and the types of converting apparatus through which the construction will likely pass. Preferred PSA compositions comprise about 84.5 to 95% by weight of the PSA copolymer; a positive amount up to about 3% by weight of an emulsifiable wax; and about 5.0 to 12.5% by weight of a plasticizer. It is contemplated that the PSA composition may contain more than one type of each of the PSA copolymer, wax, and plasticizer. A small amount of surfactant and defoamer is also preferably included.

The PSA composition can be applied to a release liner or facestock using conventional methods. For example, the PSA composition can be applied to a release liner using slide coating, multilayer die coating, die/slide combination coating, and the like, and then laminated to a facestock. In some embodiments, a dual die, as described in U.S. Pat. No. 5,728,430 (the disclosure of which is incorporated herein by reference) is used to coat a two-layer adhesive laminate onto a release liner. In particular, a face side adhesive (FSA) and a liner side adhesive (LSA) are coated using the dual die, with the LSA adjacent the release liner and the FSA available for lamination to the facestock. In a preferred embodiment, the FSA is a "permanent" PSA, which aggressively bonds to the facestock, while the LSA is a removable adhesive composition as described herein. Permanent PSAs are well known and include, for example, acrylic PSAs available from a variety of companies.

In the accompanying figure, a multilayer PSA construction is schematically illustrated. The construction 10 comprises a facestock 12, with inner and outer surfaces, 12a and 12b, having adhered thereto an adhesive laminate 14 formed of at least two layers—a face side adhesive (FSA) layer 16 and a liner side adhesive (LSA) layer 18. The adhesive laminate is protected until use by a release liner 20 having a release surface 22. The adhesive laminate 14 has two adhesive layers, as shown, or multiple adhesive layers. The thickness of each layer of the laminate construction 10 is exaggerated for clarity, and the relative thicknesses of the layers are not to scale.

In other embodiments, the facestock is itself coated with a primer, to which the improved, removable PSA composition of the present invention is applied. In still another embodiment, the improved PSA composition is transfer coated onto a 100μ corona-treated polyethylene film having no primer. Normally, a primer is considered essential for transfer coating of adhesives onto polyethylene film; the improved PSA composition, however, provides the unexpected result of yielding a PSA construction that gives good adhesive performance (i.e., 90° peel adhesion) despite the absence of a primer.

While adhesive coat weights can vary considerably, depending upon the facestock and intended application, in general, the adhesive is applied to a dry coat weight of from 15 to 25, more preferably about 19–21, g/m².

A wide variety of facestocks or backings, including paper and polymeric film facestocks, are contemplated for use with the present invention. The facestock may be primed or unprimed. Non-limiting examples of paper facestocks include high gloss paper, primer coated MC90 paper, C2S matte litho paper, uncoated offset paper, recycled matte litho paper, latex-saturated face paper, clear acetate, matte acetate, polyvinyl chloride film, polyethylene film, other polyolefin films, and the like. In some embodiments, the facestock is a polyethylene film which has been treated by corona discharge, a well-known surface treatment. The improved PSA compositions described herein are particularly contemplated for use with thermal papers used in thermal printing processes. Such papers are internally weak and can easily tear when a label on tape construction made therewith is removed from a substrate. 90° peel forces as low as 5 N/25 mm can cause thermal papers to tear.

EXAMPLES

The following examples and control illustrate several non-limiting embodiments of the invention, its preparation, and performance.

PSA Copolymers

A base polymer containing no multifunctional crosslinking monomer was prepared by free-radical emulsion polymerization according to the following procedure, using the components identified in Table 2.

TABLE 2

Base PSA Copolymer

| Component | Mass (g) | Notes |
|---|---|---|
| 1 de-ionised Water | 357.44 | initial reactor loading |
| 2 Aerosol A102[1] | 0.50 | " |
| 3 Disponil FES-77[2] | 0.50 | " |
| 4 potassium persulphate | 5.61 | " |
| 5 de-ionised water | 219.11 | pre-emulsion mixture |
| 6 tetra sodium pyrophosphate | 2.87 | " |
| 7 Disponil FES-77 | 78.17 | " |
| 8 Aerosol A102 | 23.69 | " |
| 9 Aerosol OT-75[3] | 2.32 | " |
| 10 2-ethylhexyl acrylate | 1531.63 | " |
| 11 methacrylic acid | 22.03 | " |
| 12 acrylic acid | 9.47 | " |
| 13 n-dodecyl mercaptan | 0.24 | " |
| 14 de-ionised water | 170.55 | initiator solution |
| 15 potassium persulphate | 5.90 | " |
| 16 de-ionised water | 11.84 | to reactor |
| 17 ammonia 24% | 11.84 | " |
| 18 Metatin 910[4] | 3.65 | biocide |
| 19 de-ionised water | 42.64 | rinse water used in process |
| TOTAL | 2500.00 | |

[1]Disodium ethoxylated alcohol half ester of sulfosuccinic acid, an anionic emulsifier from Cytec Industries Inc. (Morristown, NJ)
[2]Sodium lauryl ether sulfate, an anionic emulsifier from Henkel Corp. (Ambler, PA)
[3]Dioctyl ester of sodium sulfosuccinic acid, an anionic surfactant from Cytec Industries Inc.
[4]Biocide, from Acima Chemical Industries, Ltd. (CH-9471 Buchs/SG, Switzerland)

A reactor equipped with a stirrer, heat source, and nitrogen inlet was purged with nitrogen and charged with components (1–3), then heated to 78° C. Potassium persulphate (4) was added to the reactor, and the reactor contents were mixed for five minutes. Thereafter, the pre-emulsion mixture (5–13) was fed into the reactor over a 235 minute period. The temperature of the reactor batch was allowed to rise to 80° C. and then maintained at that temperature throughout the polymerization reaction. An initiator solution (14–15) feed was commenced 15 minutes after the pre-emulsion feed began. The pre-emulsion mixture feed was complete 235 minutes after it started. 15 minutes later, the initiator solution feed ended. Ten minutes later, an ammonia/water mixture (16–17) was fed into the reactor over a 60 minute period. The reactor contents were allowed to cool, and when the temperature reached 38° C., a biocide (18) was added. The rinse water (19) was used throughout the process to wash out the various feed vessels and lines, and to rinse the reactor at the end of the polymerization.

The resulting polymer had a gel content of about 61% and a $T_g$ of about −58° C. (DSC).

PSA Polymers 1–7

Each of the inherently tacky, emulsion acrylic PSA copolymers 1–7 were prepared in a manner identical to that described above with respect to the base polymer, except that a multifunctional crosslinking monomer was included in the pre-emulsion mixture. PSAs 1–5 contained, respectively, 0.025%, 0.050%, 0.100%, 0.200%, and 0.400% by weight of diallyl maleate, based on the weight of all monomers. PSA 6 contained 0.500% by weight of tripropylene glycol diacrylate. PSA 7 contained 0.500% by weight of ethylene glycol dimethacrylate. The gel content of PSA 3 was approximately 67% by weight.

PSA Compositions

Using the base polymer or the PSA polymers of Examples 1–7, a series of PSA compositions (Control 1 and Examples 1–14) were prepared by compounding the PSA polymer with a wax emulsion, a plasticizer, and a minor amount of a surfactant (soap mixture) and a defoamer.

Control 1

PSA Composition Control 1 was prepared according to the following procedure, using the components identified in Table 3.

TABLE 3

PSA Composition Control 1

| | Component | % By Weight | % Solids |
|---|---|---|---|
| 1 | base polymer | 89.645 | 64 |
| 2 | de-ionised water | 2.865 | 0 |
| | Soap Mixture | | |
| 3 | de-ionised water | 0.330 | |
| 4 | isopropanol | 0.330 | 0 |
| 5 | Aerosol OT-75 | 0.330 | 75 |
| | Wax Emulsion | | |
| 6 | Aquacer 533 | 1.800 | 40 |
| | Plasticizer | | |
| 7 | butyl benzyl phthalate | 4.500 | 100 |
| | Defoamer | | |
| 8 | Drewplus T-1201[1] | 0.200 | 100 |
| | TOTAL | 100.000% | |

[1]Available from Drew Ameroid Deutschland GmbH (D-63073 Offenbach, Germany

First, the base polymer (1) was diluted with de-ionised water (2). Second, the soap mixture (3–5) was added to the formulation, which was then thoroughly mixed. Third, the wax emulsion (6) was added, with more mixing, followed by the plasticizer (7) with mixing, and then the defoamer (8), and the entire formulation was thoroughly mixed. For removability testing, Control 1 was transfer coated onto a primered MC90 paper facestock.

The $T_g$ of Control 1 was −63° C., 5° lower than the $T_g$ of the base polymer.

Examples 1–7

PSA composition Examples 1–7 were prepared in a similar manner, substituting the PSA compositions 1–7, respectively, for the base polymer.

Example 8

PSA composition Example 8 was similar to Example 1, but was compounded with a PSA polymer prepared on a pilot, rather than a laboratory scale.

Example 9

PSA composition Example 9 was similar to Example 3, but was compounded with a PSA polymer made on a pilot, rather than a laboratory scale.

Example 10

PSA composition Example 10 was similar to Example 3, but contained 25% more plasticizer. All other components remained unchanged.

Example 11

PSA composition Example 11 was similar to Example 3, but contained 50% more plasticizer. All other components remained unchanged. The measured $T_g$ of the composition was −64.5° C., over 5° lower than the $T_g$ of the uncompounded PSA copolymer (PSA polymer 3).

Example 12

PSA composition Example 12 was similar to Example 11, but contained 33% less wax emulsion. All other components remained unchanged.

Example 13

PSA composition Example 13 was similar to Example 11, but contained 67% less wax emulsion. All other components remained unchanged.

For removability testing, each of Examples 1–13 was transfer coated onto a primer-coated MC90 paper facestock.

Example 14

PSA composition Example 14 was similar to Example 10, but was pilot coated onto a 100μ polyethylene film facestock which had previously been treated by in-line corona discharge.

Example 15

PSA composition 15 was similar to Example 10, but the adhesive was pilot coated onto a 100μ polyethylene facestock at 15 g/m² primed with 6 g/m² of a permanent acrylic adhesive made by Avery Dennis on, using a dual die.

PSA Removability Tests

Each of the PSA polymers and adhesive compositions described above was evaluated for removability from several substrates by conducting a series of 90° C. peel tests. With the exception of Ex. 14 and 15, in each case a PSA copolymer or PSA composition was transfer coated from a siliconized glassine liner onto a primer-coated MC90 paper facestock and dried for five minutes at 120° C. MC90 paper is single-sided, clay-coated paper, supplied by Donside Paper Co., Ltd. (Aberdeen, Scotland). The coat weight of each PSA copolymer or PSA composition tested was 19–21 g/m², after drying. Each construction was die-cut into a strip approximately 25×204 mm(1×8 in) in dimension. The strips were centered along their lengthwise direction and applied to 5 cm×15 cm or 5 cm×18 cm test panels of the following substrates: stainless steel, glass, poly(methyl methacrylate) (PMMA), high density polyethylene (HDPE), monomeric plasticized polyvinyl chloride (PVC) (glossy side), cardboard (grey corrugated cardboard supplied by Crown Van Gelder (1951 AZ Velzem Nord, Holland)), and vellum (uncoated paper supplied by UPM-Kymmene (Valkeakoski, Finland) ) (glossy side). The test strips were rolled out onto the substrates at 200 mm/s, back and forth twice, according to FINAT test method FTM-2, using a Standard FINAT roller (92–98 mm diameter, 50 mm wide, 2 kg weight, with a rubber covering having a shore hardness of 75–85). The adhered samples were aged on the panels for 20 min, 24 h, one week, or one month, in a controlled environment testing room maintained at room temperature (23±2° C.) and 50% relative humidity. After conditioning, the test strips were peeled away from the test panels in an Instron Universal Tester® according to the FINAT test method FTM-2 (4th edition 1995), Peel Adhesion (90°) at 300 mm/min. The force to remove the adhesive test strips from the test panels was measured in N/25 m, using a load cell linked to a computer to estimate the values. All tests were conducted in triplicate and the results were averaged. The results of the peel tests are reported in Table 4.

TABLE 4

PSA Removability
90° Peel (N/25 mm) At Room Temperature

| Sample | Stainless Steel | | | | Glass | | | | PMMA | | | | HDPE | | | |
| --- | --- | --- | --- | --- | --- | --- | --- | --- | --- | --- | --- | --- | --- | --- | --- | --- |
| | 20 Min | 24 h | 1 Week | 1 Month | 20 Min | 24 h | 1 Week | 1 Month | 20 Min | 24 h | 1 Week | 1 Month | 20 Min | 24 h | 1 Week | 1 Month |
| PSA 1 | 4.2 | 5.7 | 6.9 | 7.8 | 4.2 | 5.7 | 6.9 | 7.8 | 3.8 | 5.0 | 6.3 | 5.9 | 3.0 | 2.8 | 3.1 | 3.2 |
| PSA 2 | 3.7 | 4.8 | 5.5 | 6.4 | 3.7 | 4.8 | 5.5 | 6.4 | 4.1 | 5.0 | 5.2 | 5.8 | 2.8 | 2.9 | 3.1 | 3.4 |
| PSA 3 | | | | | 3.0 | 3.4 | 3.3 | 2.8 | 4.1 | 4.2 | 4.7 | 4.4 | 2.7 | 2.9 | 3.0 | 3.3 |
| PSA 4 | | | | | 2.9 | 3.0 | 1.9 | 3.0 | 3.4 | 3.6 | 3.1 | 3.5 | 1.7 | 2.1 | 2.5 | 2.4 |
| PSA 5 | 0.9 | 0.9 | 1.0 | | 1.1 | 0.9 | | | 1.6 | 1.4 | | | 0.7 | 0.7 | 0.6 | |
| PSA 6 | 3.7 | 4.5 | 5.0 | 5.0 | | | | | | | 5.9 | 5.7 | 2.5 | 2.7 | 2.7 | 3.3 |
| PSA 7 | 4.4 | 5.6 | 4.2 | 4.1 | | | | | 3.5 | 4.3 | 4.7 | 4.7 | 2.5 | | 2.8 | 3.4 |
| Control 1 | 1.9 | 2.2 | 2.6 | 3.0 | 1.8 | 2.2 | 2.3 | 2.8 | 2.1 | 2.4 | 2.7 | 2.9 | 1.9 | 2.4 | 3.3 | 3.6 |
| Example 1 | 1.5 | 1.8 | 2.0 | 2.0 | | | | | 1.4 | 1.4 | 1.5 | 1.6 | 1.5 | 1.8 | 2.0 | 2.0 |
| Example 2 | 1.4 | 1.7 | 1.8 | 1.8 | | | | | 1.3 | 1.4 | 1.5 | 1.5 | 1.5 | 1.7 | 1.9 | 2.1 |
| Example 3 | | | | | 1.1 | 1.1 | 1.5 | 1.5 | 1.2 | 1.3 | 1.3 | 1.4 | 1.0 | 1.2 | 1.9 | 1.9 |
| Example 4 | | | | | 0.8 | 0.8 | 1.0 | 1.7 | 0.8 | 0.8 | 1.1 | 1.0 | 0.6 | 1.1 | 1.5 | 1.7 |
| Example 5 | 0.2 | 0.2 | 0.3 | | 0.2 | 0.2 | 0.3 | | 0.2 | 0.3 | 0.4 | | 0.2 | 0.2 | 0.6 | |
| Example 6 | 1.4 | 1.7 | 1.6 | 1.7 | | | | | 1.2 | 1.2 | 1.5 | 1.5 | 1.6 | 1.8 | 1.8 | 2.0 |
| Example 7 | 1.4 | 1.5 | 1.5 | 1.7 | | | | | 1.4 | 1.3 | 1.2 | 1.5 | 1.6 | 1.8 | 1.8 | 1.9 |
| Example 8 | 1.4 | 1.6 | 1.4 | 1.4 | | | | | 1.2 | 1.4 | 1.2 | 1.3 | 1.5 | 1.9 | 1.6 | 2.2 |
| Example 9 | 1.2 | 1.5 | 1.6 | 1.8 | | | | | 1.2 | 1.5 | 1.4 | | 1.2 | 1.7 | 2.6 | 3.1 |

TABLE 4-continued

PSA Removability
90° Peel (N/25 mm) At Room Temperature

| | | | | | | | | | | | | | | | | |
|---|---|---|---|---|---|---|---|---|---|---|---|---|---|---|---|---|
| Example 10 | 1.3 | 1.5 | 1.8 | 1.9 | | | | | 1.4 | 1.5 | 1.5 | | 1.7 | 1.9 | 2.2 | 2.8 |
| Example 11 | 1.2 | 1.4 | 1.6 | 1.7 | | | | | 1.1 | 1.3 | 1.4 | | 1.3 | 1.7 | 2.2 | 2.6 |
| Example 12 | | | | | 1.4 | 1.5 | 1.5 | 1.8 | 1.3 | 1.4 | 1.4 | 1.7 | 1.9 | 2.3 | 2.3 | 3.1 |
| Example 13 | | | | | 1.8 | 2.0 | 2.0 | 2.3 | 1.7 | 1.7 | 1.7 | 2.1 | 2.1 | 2.6 | 2.6 | 3.2 |
| Example 14 | | | | | 1.2 | 1.3 | 1.3 | 1.3 | 1.0 | 1.3 | 1.4 | 1.4 | 0.8 | 1.2 | 1.3 | 1.5 |
| Example 15 | | | | | 1.9 | 1.9 | 2.0 | 2.1 | 1.6 | 1.7 | 1.8 | 1.8 | 1.2 | 1.8 | 1.7 | 2.0 |

| | Plasticised PVC | | | | Cardboard | | | | Vellum | | | |
|---|---|---|---|---|---|---|---|---|---|---|---|---|
| Sample | 20 Min | 24 h | 1 Week | 1 Month | 20 Min | 24 h | 1 Week | 1 Month | 20 Min | 24 h | 1 Week | 1 Month |
| PSA 1 | 5.3 | 6.3 | 6.5 | 6.6 | 3.2 | 3.9 | 4.0 | pt | 5.9 | 7.1 | 7.0 | 7.0 |
| PSA 2 | 5.3 | 5.7 | 5.7 | 5.5 | 2.5 | 3.6 | 3.5 | 3.7 | 5.2 | 5.9 | 6.2 | 6.4 |
| PSA 3 | 3.8 | 3.9 | 4.3 | 3.7 | 1.8 | 2.2 | 2.0 | 2.0 | 3.1 | 3.1 | 3.8 | 3.5 |
| PSA 4 | 3.6 | 3.6 | 3.2 | 3.0 | 1.1 | 1.0 | 1.2 | 1.0 | 2.1 | 2.1 | 2.3 | 2.4 |
| PSA 5 | 1.5 | 1.7 | 1.0 | | <0.1 | 0.1 | <0.1 | | 0.5 | 0.5 | 0.5 | |
| PSA 6 | 4.5 | 4.7 | 5.4 | 5.1 | 2.4 | | 2.1 | 2.3 | 4.0 | 5.4 | 6.2 | 6.3 |
| PSA 7 | 4.2 | 5.4 | 4.6 | 4.1 | 1.9 | 2.7 | 2.4 | 2.5 | | | 6.4 | 6.7 |
| Control 1 | 1.7 | 2.0 | 1.9 | 2.6 | 1.4 | 1.9 | 1.6 | 2.0 | 2.5 | 3.1 | 3.2 | 4.0 |
| Example 1 | 1.5 | 1.6 | 1.8 | 1.8 | 0.7 | 1.0 | 1.1 | 1.0 | 2.0 | 2.5 | 2.3 | 2.6 |
| Example 2 | 1.5 | 1.6 | 1.7 | 1.8 | 0.6 | 0.9 | 0.9 | 0.9 | 1.5 | 1.8 | 1.9 | 2.2 |
| Example 3 | 1.2 | 1.5 | 1.4 | 1.4 | 0.3 | 0.4 | 0.3 | 0.4 | 1.0 | 1.1 | 1.3 | 1.3 |
| Example 4 | 0.8 | 1.0 | 0.9 | 0.9 | 0.1 | 0.2 | <0.1 | 0.2 | 0.6 | 0.7 | 0.7 | 0.9 |
| Example 5 | 0.2 | 0.3 | 0.3 | | <0.1 | <0.1 | <0.1 | | <0.1 | <0.1 | 0.1 | |
| Example 6 | 1.2 | 1.5 | 1.8 | 1.9 | 0.3 | 0.5 | 0.2 | 0.3 | 1.2 | 1.4 | 1.6 | 1.8 |
| Example 7 | 1.2 | 1.4 | 1.5 | 1.6 | 0.4 | 0.5 | 0.3 | 0.4 | 1.2 | 1.5 | 2.0 | 2.0 |
| Example 8 | 1.3 | 1.5 | 1.3 | 1.5 | 0.6 | 0.7 | 0.5 | 0.8 | 1.3 | 1.7 | 1.5 | 1.8 |
| Example 9 | 1.1 | 1.7 | 1.7 | 1.8 | 0.3 | 0.4 | 0.3 | 0.4 | 1.0 | 1.5 | 1.5 | 1.9 |
| Example 10 | 1.1 | 1.5 | 1.6 | 1.6 | 0.3 | 0.5 | 0.4 | | 1.1 | 1.4 | 1.4 | 1.6 |
| Example 11 | 0.9 | 1.3 | 1.5 | 1.7 | 0.3 | 0.4 | 0.3 | | 0.9 | 1.2 | 1.3 | 1.5 |
| Example 12 | 1.2 | 1.4 | 1.6 | 1.7 | 0.5 | 0.5 | 0.7 | 0.6 | 1.3 | 1.5 | 1.6 | 1.9 |
| Example 13 | 1.7 | 1.9 | 2.2 | 2.2 | 0.8 | 0.8 | 0.9 | 0.9 | 1.8 | 1.9 | 2.4 | 2.2 |
| Example 14 | 1.0 | 1.2 | 1.3 | 1.4 | 0.5 | 0.7 | 0.8 | 0.8 | 1.0 | 1.2 | 1.4 | 1.5 |
| Example 15 | 1.7 | 1.7 | 1.7 | 1.9 | 0.8 | 1.1 | 1.1 | 1.2 | 1.4 | 1.6 | 1.8 | 2.0 |

90° peel testing of the samples revealed several useful insights and unexpected results provided by the invention. Peel values for the uncompounded PSAs (PSA copolymers 1–7) were not only high to begin with, but built with aging, indicating that it is not possible to use the PSA copolymer as a removable adhesive without the wax emulsion and plasticizer addition. The adhesion to cardboard of uncompounded PSA 1, for example, built to such a high level after one month that the peel test caused the cardboard substrate to tear, as denoted by the abbreviation "pt" (paper tear) in Table 4.

Control 1, which was formulated with the base polymer—and contained no multifunctional crosslinking monomer—showed an increase in peel values over time. By using crosslinked emulsions (Examples 1–15), it was possible to substantially reduce the build in adhesion over time. Example 3 showed the best balance of adhesion on all surfaces.

Examples 1–7 were formulated using a PSA copolymer prepared according to the laboratory procedure (and described above with reference to the Base Polymer). Examples 8–15 were formulated using a PSA copolymer prepared on a larger, pilot scale. This had an interesting affect on some of the peel values. For instance, Example 9 showed a higher than desired peel value on HDPE. To reduce that value, Examples 10 and 11, containing more plasticizer, were prepared; the result was a desirable drop in peel value on HDPE, but without a significant reduction in the measured peel value on other surfaces. The increased plasticizer did, however, change the "feel" of the product. Example 11, for example, had a wet type of tack, reminiscent of the feel of solvent-based PSA products. In some sectors, solvent-based products (generally rubber-based polymers cast from organic solvents) are perceived to be better products in terms of removability, but they suffer from the drawbacks associated with the use of organic solvents. Example 11 shows that an emulsion acrylic PSA, having the feel of a solvent product, can be prepared and exhibits desirably low peel values.

Examples 6 and 7 show that crosslinking monomers other than diallyl maleate, which is a tri-functional crosslinking monomer, can be used. EGDMA and TPGAA are di-functional monomers.

Examples 12–13 show that at a 0.1% by weight concentration of multifunctional crosslinking monomer, the amount of wax used in the formulation is important. Peel values were higher for Example 12, which contained 33% less wax than Example 3, and higher still for Example 13, which had 67% less wax than Example 3.

Example 14 shows that very low peel values can be obtained when the PSA compositions of the present invention are coated onto corona-discharge treated polyethylene.

Example 15 shows the minimal build in adhesion that results when a label construction is made with a dual-die coated, corona discharge-treated polyethylene film facestock, using a PSA composition according to the present invention.

Examples 16–20

To evaluate the effect of adhesive coat weight on performance in a multilayer construction, a set of PSA constructions was prepared and evaluated for room temperature (RT) shear and loop tack, low temperature (−20° C.) loop tack, and 90° peel adhesion after 10 and 30 days exposure to UV light. (UV irradiation is known, generally, to cause polymer crosslinking, which tends to increase the cohesive strength (shear resistance) of polymers, while decreasing their tack and peel adhesion.)

In Example 16, a single PSA composition (described below) was coated to a 21 g/m² dry coat weight onto a siliconized release liner (BG40), and then laminated to a corona discharge-treated polyethylene facestock (PE95). The PSA composition consisted of a base copolymer (formed from a plurality of monomers, including diallyl maleate, a multifunctional crosslinking monomer), which was compounded with a wax and a surfactant. The base copolymer was prepared as described below, using the components identified in Table 5.

TABLE 5

Base PSA Copolymer

| Component | | Mass (g) | Notes |
|---|---|---|---|
| 1 | de-ionised Water | 354.57 | initial reactor loading |
| 2 | Aerosol A102 | 0 | " |
| 3 | Disponil FES-77 | 0.99 | " |
| 4 | potassium persulphate | 5.62 | " |
| 5 | de-ionised water | 220.34 | pre-emulsion mixture |
| 6 | tetra sodium pyrophosphate | 2.85 | " |
| 7 | Disponil FES-77 | 78.05 | " |
| 8 | Aerosol A102 | 11.74 | " |
| 9 | Aerosol OT-75 | 17.50 | " |
| 10 | 2-ethylhexyl acrylate | 1530.16 | " |
| 11 | methacrylic acid | 22.10 | " |
| 12 | acrylic acid | 9.44 | " |
| 13a | n-dodecyl mercaptan | 0.24 | " |
| 13b | diallyl maleate | 1.57 | " |
| 14 | de-ionised water | 170.38 | initiator solution |
| 15 | potassium persulphate | 5.89 | " |
| 16 | de-ionised water | 11.74 | to reactor |
| 17 | ammonia 24% | 11.74 | " |
| 18 | Metatin 910 | 3.64 | biocide |
| 19 | de-ionised water | 41.44 | rinse water used in process |
| | TOTAL | 2500.00 | |

A reactor equipped with a stirrer, heat source, and nitrogen inlet was charged with components (1–3) and purged with nitrogen, then heated to 78° C. Potassium persulfate (4) was added to the reactor, and the reactor contents were mixed for five minutes. Thereafter, the pre-emulsion mixture (5–13b) was fed into the reactor over a 235 minute period. The temperature of the reactor batch was allowed to raise to 80° C. and then maintained at that temperature throughout the polymerization reaction. An initiator solution feed (14–15) was commenced 15 minutes after the pre-emulsion feed began. The pre-emulsion mixture feed was complete 235 minutes after it started. Fifteen minutes later, the initiator solution feed ended. Ten minutes later, an ammonia/water mixture (16–17) was fed into the reactor over a 60 minute period. The reactor contents were allowed to cool, and when the temperature reached 38° C., a biocide (18) was added. The rinse water (19) was used throughout the process to wash out the various feed vessels and lines, and to rinse the reactor at the end of the polymerization.

A PSA composition was prepared by compounding the base copolymer with a wax emulsion, (Acquacer 533), a plasticizer (Unimoll BB—butyl benzyl phthalate), a surfactant (Triton X-100, from Union Carbide Customer Center, Antwerp, Belgium), and a defoamer. The relative amounts by weight of each component are presented in Table 6, and their order of compounding is described below.

TABLE 6

PSA Composition

| | Component | % By Weight |
|---|---|---|
| 1 | Base Polymer | 88.963 |
| 2 | Water Surfactant | 2.055 |
| 3 | Triton X-100 Wax Emulsion | 0.299 |
| 4 | Acquacer 533 Plasticizer | 1.785 |
| 5 | Unimoll BB Defoamer | 6.699 |
| 6 | Drewplus T-1201 | 0.199 |

First, the surfactant was added to the base polymer and mixed for 30 minutes. The wax emulsion was added to the formulation, which was then mixed for 15 minutes. The plasticizer was added, and the formulation was mixed for 15 minutes. The defoamer was added, and the entire formulation was mixed for 10 minutes.

In each of Examples 17–19, a dual die was used to coate a liner side adhesive (LSA) and a face side adhesive (FSA). The removable PSA composition described above in Tables 5–6 was used as the LSA. The FSA was a "permanent" (non-removable PSA) emulsion acrylic copolymer comprised of 2-ethylhexyl acrylate, vinyl acetate, methyl acrylate, acrylic acid, and methacrylic acid, made by Avery Dennison Corporation. Corona discharge-treated PE was used as the facestock. The LSA and FSA coat weights in Examples 17–20 were varied as described in Table 7, which presents adhesive performance data for Examples 16–20. The following test methods were used:

90° Peel Adhesion

The 900 Peel Adhesion test is described above.

Room Temperature Loop Tack

Loop tack measurements were made for samples cut to 25×204 mm (1×8 in) sized strips using polyethylene, glass, or cardboard as the substrate at a withdraw rate of about 305 mm/min (12 in/min), according to standard test 1994 TLMI Test L-IB2, TLMI Loop Tack Test, by the Tag and Label Manufacturers Institute Inc. (TLMI), using an Instron Universal Tester Tester Model 4501 from Instron (Canton, Mass.). Loop tack values were taken to be the highest measured adhesion value observed during the test. All tests were conducted in triplicate. The failure mode was flow peel, or clean panel failure, in which the adhesive is stretched and smoothly pulled from the substrate.

Low Temperature Loop Tack

Low temperature loop tack tests were conducted on polyethylene as described above except that the samples were put in a chamber at −20° C. for approximately 2.5 minutes, the sample was lowered at a rate of 305 mm/min and taken up at a withdraw rate of 50 mm/min.

Room Temperature Shear (RTS)

In static shear testing, the samples were cut into 12×51 mm (½×2 in) test strips. The test strips were applied to brightly annealed, highly polished stainless steel test panels, where the typical size of the test panels was 50×75 mm (2×3 in), making a sample overlap of 12×12 mm (½×½ in) with the test panel. The sample portion on the test panel was rolled down using a 2 kg (4.5 lb.), 5.45 phi 65 shore "A" rubber-faced roller, rolling back and forth once, at a rate of 30 cm/min (12 in/min). After a dwell time of at least 15 minutes under standard laboratory testing conditions, the test panels with the test strips on them were then placed at an angle 2° from the vertical, and a load of 500 g was attached to the end of the test strips. The time in minutes for the sample to fail cohesively was measured by a timer. All tests were conducted in triplicate.

TABLE 7

Multilayer Adhesive Constructions

|  | Ex. 16 | Ex. 17 | Ex. 18 | Ex. 19 | Ex. 20 |
|---|---|---|---|---|---|
| LSA Coat Weight (g/m$^2$) | 21 | 17 | 15 | 13 | 11 |
| FSA Coat Weight (g/m$^2$) | 0 | 4 | 6 | 8 | 10 |
| Shear (min.) at RT | 2.7 | 5.7 | 7.7 | 7.7 | 8.3 |
| Loop Tack (N/25 mm) at RT |  |  |  |  |  |
| PE | 1.4 | 2.2 | 2.2 | 2.1 | 2.2 |
| Glass | 1.8 | 2.5 | 3.0 | 3.6 | 3.9 |
| Cardboard | 0.9 | 1.4 | 1.6 | 1.4 | 1.0 |
| Loop Tack (N/25 mm) at −20° |  |  |  |  |  |
| PE | 5.6 | 5.2 | 5.0 | 4.4 | 5.6 |
| 90° Peel Adhesion (N/25 mm) After 10 days UV light |  |  |  |  |  |
| SS | 1.1 | 1.7 | 2.0 | 2.1 | 2.0 |
| Glass | 1.2 | 1.8 | 2.2 | 2.4 | 2.3 |
| PVC | 1.2 | 2.1 | 2.3 | 2.8 | 2.6 |
| Paper | 1.3 | 2.0 | 2.2 | 2.6 | 2.4 |
| 90° Peel Adhesion (N/25 mm) After 30 days UV light |  |  |  |  |  |
| SS | 1.3 | 1.8 | 1.9 | 2.2 | 2.2 |
| Glass | 1.2 | 2.0 | 2.4 | 2.6 | 2.6 |
| PVC | 1.2 | 2.2 | 2.5 | 2.9 | 2.9 |
| Paper | 1.4 | 2.0 | 2.4 | 2.8 | 2.5 |

Several observations can be made about the adhesive performance of Examples 16–20. First, the single-layer construction (Example 16) demonstrates that the new, removable PSA described herein exhibits an acceptable level of anchorage to a corona discharge-treated PE facestock, even without the use of a primer or an anchorage layer (i.e., an FSA).

Second, to a slight degree, the lowest peel adhesion values (greatest removability) after 10 days and 30 days UV irradiation were exhibited by Example 16, the single-layer adhesive construction. However, the peel adhesion values exhibited by Examples 17–20 were more than adequate for the constructions to function as removable PSAs, even after 30 days exposure to UV radiation. All five examples exhibited good low temperature performance (i.e., −20° C. loop tack) with soft flow peel (the ultimate failure mode during testing) from HDPE substrates.

Non-irradiated samples of Examples 16–20 also showed minimal build in adhesion on stainless steel, glass, HDPE, PVC, PP, cardboard, and paper, after one day, one week, and one month aging, as determined by 90° peel adhesion tests. The failure mode in each case was flow peel. Depending on the substrate and the amount of aging, the observed peel forces ranged from 0.7–1.8 N/25 mm for Example 16, to 1.2–3.2 N/25 mm for Example 20.

Significant cost savings can be realized with the multilayer constructions. The LSA used in Examples 16–20 is approximately 20% more expensive than the FSA. As the coat weight of the FSA is increased relative to the coat weight of the LSA, the overall cost of the construction decreases. Examples 17–20 show that a lower cost, removable PSA construction can be prepared without sacrificing removability performance. In Examples 20, the overall cost savings is about 10%. In addition, the multilayer constructions exhibited higher shear strength, less bleed, and the ability to be passed through converting machinery (used, e.g., in slitting, sheeting, die-cutting, and other operations) at higher speeds that the single-layer, 100% LSA construction.

The invention in its broader aspects is not limited to the specific details presented herein. Departures from such details may be made without departing from the principles of the invention, which is limited only by the following claims. Throughout the text and the claims, use of the word "about" in relation to a range of numbers is intended to modify both the low and high values stated.

What is claimed is:

1. A removable, pressure-sensitive adhesive (PSA) composition, comprising:
    a PSA copolymer of a plurality of copolymerizable monomers and at least one multifunctional crosslinking monomer;
    a citrate plasticizer.

2. A removable, PSA composition as recited in claim 1, wherein the PSA copolymer is a copolymer of (a) about 84 to 98% by weight of one or more alkyl acrylates having from about 4 to 12 carbon atoms in the alkyl group; (b) about 0.25 to 5% by weight of one or more acid monomers; (c) 0 to about 10% by weight of one or more hard monomers; (d) 0 to about 10% by weight of one or more polar monomers other than the acid monomer(s), where the total of (c) and (d) does not exceed about 10% by weight; and (e) about 0.01 to 1% by weight of one or more multifunctional crosslinking monomers.

3. A removable, PSA composition as recited in claim 2, wherein said one or more alkyl acrylates is selected from the group consisting of butyl, hexyl, heptyl, n-octyl, iso-octyl, 2-ethylhexyl, and nonyl acrylate, and mixtures thereof.

4. A removable, PSA composition as recited in claim 2, wherein said one or more acid monomers is selected from the group consisting of acrylic, methacrylic, and itaconic acid, and mixtures thereof.

5. A removable, PSA composition as recited in claim 2, wherein said one or more hard monomers is selected from the group consisting of methyl and ethyl acrylate, methyl and ethyl methacrylate, vinyl acetate, styrene, and mixtures thereof.

6. A removable PSA composition as recited in claim 2, wherein said one or more polar monomers is selected from the group consisting of hydroxyethyl acrylate and methacrylate, hydroxypropyl acrylate, and glycidyl methacrylate.

7. A removable, PSA composition as recited in claim 1, wherein the plurality of copolymerizable monomers comprises about 98% by weight of 2-ethylhexyl acrylate, or a mixture of 2-ethylhexyl acrylate and butyl acrylate, and about 2% by weight of methacrylic acid, acrylic acid, or mixtures thereof.

8. A removable, PSA composition as recited in claim 1, wherein the plurality of copolymerizable monomers comprises about 98% by weight of 2-ethylhexyl acrylate, about 1.4% by weight of methacrylic acid, and about 0.6% by weight of acrylic acid.

9. A removable, PSA composition as recited in claim 1, wherein the multifunctional crosslinking monomer is present in an amount of about 0.01 to 1.0% by weight, based on the weight of copolymerizable monomers and multifunctional crosslinking monomer.

10. A removable, PSA composition as recited in claim 1, wherein the multifunctional monomer is selected from the group of compounds consisting of multifunctional maleates, acrylates, methacrylates, allylic compounds, vinyl functional monomers, and mixtures thereof.

11. A removable, PSA composition as recited in claim 1, wherein the multifunctional monomer is selected from the group consisting of diallyl maleate, ethylene glycol dimethacrylate, tripropylene glycol diacrylate, allyl methacrylate, divinyl benzene, N,N'-methylene-bis-acrylamide, triallyl cyanurate, and mixtures thereof.

12. A removable, PSA composition as recited in claim 1, wherein the multifunctional monomer is present in an amount of from about 0.025 to 0.5% by weight, on a copolymerized basis, based on the weight of monomers.

13. A removable, PSA composition as recited in any of claims 1 to 12, coated on or applied to a primed or unprimed facestock.

14. A removable, PSA composition as recited in claim 13, wherein the facestock is a corona discharge-treated polyethylene film.

15. A removable, PSA composition as recited in claim 14, wherein the facestock is unprimed.

16. A removable, PSA composition as recited in claim 13, wherein the facestock is a thermal paper.

17. A removable, pressure-sensitive adhesive (PSA) construction, comprising:
   a PSA composition coated on or applied to a primed or unprimed facestock, the composition comprising a PSA copolymer of a plurality of copolymerizable monomers and at least one multifunctional crosslinking monomer;
   a wax; and
   a citrate plasticizer.

18. A removable, PSA construction as recited in claim 17, wherein the PSA copolymer is a copolymer of about 84 to 98% by weight of at least one alkyl acrylate having from about 4 to 8 carbon atoms in the alkyl group, about 0.25 to 5% by weight of acrylic, methacrylic and/or itaconic acid, and from about 0.01 to 1.0% by weight of a multifunctional crosslinking monomer.

19. A removable, PSA construction as recited in claim 17, wherein the crosslinking monomer is selected from the group consisting of multifunctional maleates, acrylates, methacrylates, allylic compounds, vinyl functional monomers, and mixtures thereof.

20. A removable, PSA construction as recited in claim 17, wherein the crosslinking monomer is selected from the group consisting of diallyl maleate, ethylene glycol dimethacrylate, tripropylene glycol diacrylate, allyl methacrylate, divinyl benzene, N,N'-methylene-bis-acrylamide, triallyl cyanurate, and mixtures thereof.

21. A removable, PSA construction as recited in claim 17, wherein the multifunctional crosslinking monomer is diallyl maleate.

22. In a removable, pressure-sensitive adhesive (PSA) construction having a PSA composition coated on or applied to a primed or unprimed facestock, which composition contains a PSA copolymer of a plurality of monomers, an emulsifiable wax, and a plasticizer, the improvement comprising (i) a multifunctional crosslinking monomer copolymerized with the plurality of monomers and sufficient to substantially lower the 90° peel force required to remove the construction from a substrate, after at room temperature, as compared to the 90° peel force required to remove a comparison construction identical in all respects except for the absence of a multifunctional crosslinking monomer, and (ii) the plasticizer is a citrate plasticizer.

23. A removable PSA construction, comprising:
   (a) a facestock having an inner surface and an outer surface;
   (b) a face side adhesive (FSA) in contact with the inner surface of the facestock; and
   (c) a liner side adhesive (LSA) in contact with the FSA, said LSA comprising a PSA copolymer of a plurality of copolymerizable monomers and at least one multifunctional crosslinking monomer, a wax, and a citrate plasticizer.

24. A removable PSA construction as recited in claim 23, wherein the plurality of copolymerizable monomers comprises
   (i) about 84 to 98% by weight of one or more alkyl acrylates having from about 4 to 12 carbon atoms in the alkyl group,
   (ii) about 0.25 to 5% by weight of one or more acid monomers,
   (iii) 0 to about 10% by weight of one or more hard monomers,
   (iv) 0 to about 10% by weight of one or more polar monomers other than the acid monomer(s), where the total of (iii) and (iv) does not exceed about 10% by weight, and
   (v) about 0.01 to 1% by weight of one or more multifunctional crosslinking monomers.

25. A removable PSA construction as recited in claim 23, wherein the plurality of copolymerizable monomers comprises about 98% by weight of 2-ethylhexyl acrylate, or a mixture of 2-ethylhexyl acrylate and butyl acrylate, and about 2% by weight of methacrylic acid, acrylic acid, or mixtures thereof.

26. A removable PSA construction as recited in claim 23, wherein the plurality of copolymerizable monomers comprises about 98% by weight of 2-ethylhexyl acrylate, about 1.4% by weight of methacrylic acid, and about 0.6% by weight of acrylic acid.

27. A removable PSA construction as recited in claim 23, wherein the multifunctional crosslinking monomer is present in an amount of about 0.1 to 1.0% by weight, based on the weight of acrylic monomers and said at least one multifunctional crosslinking monomer.

28. A removable PSA construction as recited in claim 23, wherein the multifunctional monomer is selected from the group of compounds consisting of multifunctional maleates, acrylates, methacrylates, allylic compounds, vinyl functional monomers, and mixtures thereof.

29. A removable, PSA composition as recited in claim 23 wherein the multifunctional monomer is selected from the group consisting of diallyl maleate, ethylene glycol dimethacrylate, tripropylene glycol diacrylate, allyl methacrylate, divinyl benzene, N,N'-methylene-bis-acrylamide, triallyl cyanurate, and mixtures thereof.

30. A removable PSA construction as recited in claim 23, wherein the facestock is a corona discharge-treated polyethylene film.

31. A removable PSA construction as recited in claim 23, wherein the facestock is unprimed.

32. A removable PSA construction as recited in claim 23, wherein the facestock is a thermal paper.

33. A removable PSA composition as recited in claim 1, wherein the citrate plasticizer comprises triethyl citrate.

34. A removable PSA composition as recited in claim 1, wherein the citrate plasticizer comprises acyl tributyl citrate.

* * * * *

UNITED STATES PATENT AND TRADEMARK OFFICE
CERTIFICATE OF CORRECTION

PATENT NO. : 6,586,510 B1
DATED : July 1, 2003
INVENTOR(S) : Brown et al.

It is certified that error appears in the above-identified patent and that said Letters Patent is hereby corrected as shown below:

<u>Title page,</u>
Item [56], References Cited, U.S. PATENT DOCUMENTS, add:

| | | |
|---|---|---|
| -- 3,691,140 | 09/1972 | Silver |
| 3,932,328 | 01/1976 | Korpman |
| 4,125,665 | 11/1978 | Bemmels et al. |
| 4,151,319 | 04/1979 | Sackoff et al. |
| 4,166,152 | 08/1979 | Baker et al. |
| 4,346,189 | 08/1982 | Laurent |
| 4,379,095 | 04/1983 | Oldack |
| 4,495,318 | 01/1985 | Howard |
| 4,548,845 | 10/1985 | Parsons et al. |
| 4,598,112 | 07/1986 | Howard |
| 4,810,763 | 03/1989 | Mallya et al. |
| 5,164,444 | 11/1992 | Bernard |
| 5,183,841 | 02/1993 | Bernard |
| 5,192,612 | 03/1993 | Otter et al. |
| 5,221,706 | 06/1993 | Lee et al. |
| 5,240,989 | 08/1993 | Bernard et al. |
| 5,290,842 | 03/1994 | Sasaki et al. |
| 5,322,876 | 06/1994 | Sasaki et al. |
| 5,346,766 | 09/1994 | Otter et al. |
| 5,385,965 | 01/1995 | Bernard et al. |
| 5,420,195 | 05/1995 | Mayer et al. |
| 5,492,950 | 02/1996 | Brown et al. |
| 5,563,205 | 10/1996 | Mayer et al. |
| 5,623,011 | 04/1997 | Bernard |
| 5,705,551 | 01/1998 | Sasaki et al. |
| 5,728,430 | 03/1998 | Sartor et al. |
| 5,939,479 | 08/1999 | Reaves et al. -- |

FOREIGN PATENT DOCUMENTS, add:
-- EP 0180598    05/1986    European Patent Office
WO 00/36043    06/2000    PCT International --
OTHER PUBLICATIONS add:
-- Japanese Patent Abstract No. JP 8134421, 05/1996, 2 pages --

<u>Column 5,</u>
Line 52, change "Germany." to -- Germany). --

<u>Column 8,</u>
Line 48, change "Germany." to -- Germany). --

UNITED STATES PATENT AND TRADEMARK OFFICE
CERTIFICATE OF CORRECTION

PATENT NO. : 6,586,510 B1
DATED : July 1, 2003
INVENTOR(S) : Brown et al.

It is certified that error appears in the above-identified patent and that said Letters Patent is hereby corrected as shown below:

Column 10,
Line 3, change "Dennis on" to -- Dennison --

Column 11,
Line 58, delete "affect" and insert -- effect --

Column 12,
Line 44, delete "TPGAA" and insert -- TPGDA --

Column 13,
Line 62, delete "Acquacer" and insert -- Aquacer --

Column 14,
Table 6, item 4, delete "Acquacer" and insert -- Aquacer --
Line 26, delete "coate" and insert -- coat --
Line 47, delete "Tester Tester" and insert -- Tester --
Line 66, delete "phi" and insert -- pli --

Column 16,
Line 19, insert -- a wax; and -- after "monomer"

Signed and Sealed this

Second Day of August, 2005

JON W. DUDAS
*Director of the United States Patent and Trademark Office*